(12) United States Patent
Nakatani et al.

(10) Patent No.: US 11,977,036 B2
(45) Date of Patent: May 7, 2024

(54) INSPECTION DEVICE

(71) Applicant: ISHIDA CO., LTD., Kyoto (JP)

(72) Inventors: Makoto Nakatani, Ritto (JP);
Yoshinori Tarumoto, Ritto (JP);
Akihiro Maenaka, Ritto (JP); Hironori Tsutsumi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 904 days.

(21) Appl. No.: 16/960,861

(22) PCT Filed: Oct. 30, 2018

(86) PCT No.: PCT/JP2018/040271
§ 371 (c)(1),
(2) Date: Jul. 8, 2020

(87) PCT Pub. No.: WO2019/159440
PCT Pub. Date: Aug. 22, 2019

(65) Prior Publication Data
US 2021/0063323 A1 Mar. 4, 2021

(30) Foreign Application Priority Data
Feb. 14, 2018 (JP) ................................. 2018-023784

(51) Int. Cl.
*G01N 23/18* (2018.01)
*G01N 23/04* (2018.01)
(Continued)

(52) U.S. Cl.
CPC ............. *G01N 23/04* (2013.01); *G01N 23/18* (2013.01); *G01N 23/203* (2013.01); *G06N 20/00* (2019.01); *G06T 7/0008* (2013.01)

(58) Field of Classification Search
CPC ...... G01N 23/04; G01N 23/18; G01N 23/203; G01N 2223/401; G01N 2223/652;
(Continued)

(56) References Cited

U.S. PATENT DOCUMENTS

2007/0019841 A1* 1/2007 Hirose .................... G01N 23/04
382/110
2012/0230541 A1* 9/2012 Miyamoto .............. G06T 5/002
382/103

(Continued)

FOREIGN PATENT DOCUMENTS

CN 107145898 A 9/2017
JP 2002228761 A 8/2002
(Continued)

OTHER PUBLICATIONS

Notice of Reasons for Refusal in the corresponding Japanese Patent Application No. 2019-095784, dated Nov. 18, 2022.
(Continued)

*Primary Examiner* — Jonathan M Hansen
(74) *Attorney, Agent, or Firm* — Global IP Counselors, LLP

(57) ABSTRACT

An inspection device inspects of goods that include plural articles that sometimes overlap each other. An X-ray inspection device irradiates goods containing plural articles having a predetermined shape and inspects the goods on the basis of inspection images obtained from radiation that has passed through the goods or radiation that has reflected off the goods. The X-ray inspection device includes a storage component, a learning component, and an inspection component. The storage component stores, as teaching images, at least the inspection images of the goods that are in a state in which the plural articles overlap each other. The learning component acquires, by machine learning using the teaching images stored in the storage component, features relating to
(Continued)

the goods that are in a state in which the plural articles overlap each other. The inspection component inspects the goods using the features that the learning component has acquired.

7 Claims, 10 Drawing Sheets

(51) Int. Cl.
  *G01N 23/203*  (2006.01)
  *G06N 20/00*  (2019.01)
  *G06T 7/00*  (2017.01)
(58) Field of Classification Search
  CPC ...... G06N 20/00; G06N 3/045; G06T 7/0008; G06T 2207/10116; G06T 2207/20081; G06T 2207/20084; G06T 2207/30128; G06T 7/0004
  See application file for complete search history.

(56) References Cited

U.S. PATENT DOCUMENTS

| | | | |
|---|---|---|---|
| 2016/0223705 A1* | 8/2016 | Sugimoto | G01N 23/04 |
| 2018/0321167 A1 | 11/2018 | Tarumoto et al. | |
| 2021/0158094 A1* | 5/2021 | Ji | G06V 10/776 |
| 2021/0406693 A1* | 12/2021 | Van Vredendaal | G06N 3/084 |

FOREIGN PATENT DOCUMENTS

| | | |
|---|---|---|
| JP | 2008-014652 A | 1/2008 |
| JP | 2009192519 A | 8/2009 |
| JP | 2009229100 A | 10/2009 |
| JP | 2011089920 A | 5/2011 |
| JP | 2012242289 A | 12/2012 |
| JP | 2013210244 A | 10/2013 |
| JP | 2016114417 A | 6/2016 |
| JP | 6126230 B2 | 5/2017 |
| JP | 2018-005639 A | 1/2018 |
| WO | 2015041259 A1 | 3/2015 |
| WO | 2017014194 A1 | 1/2017 |
| WO | 2017061593 A1 | 4/2017 |

OTHER PUBLICATIONS

Patel D et al: "Soft contaminant detection using neural networks: techniques and limitations", Neural Networks, 1994. IEEE World Congress on Computational Intelligen CE., 1994 IEEE International Conference On Orlando, FL, USA 27 Jun.-Jul. 2, 1994, New York, NY, USA, IEEE, vol. 7, Jun. 27, 1994 (Jun. 27, 1994), pp. 4316-4320, XP010127957, DOI: 10.1109/ICNN.1994.374961 ISBN: 978-0-7803-1901-1.
The extended European search report in the corresponding European Patent Application No. 18 90 6493.4, dated Oct. 18, 2021.
Notification of Reason for Refusal in the corresponding Korean Patent Application No. 10-2020-7021030, dated Aug. 30, 2021.
Translation of the Written Opinion of the International Searching Authority, originally mailed on Feb. 5, 2019, Translation mailed on Aug. 18, 2020.
Decision of Refusal in the corresponding Japanese Patent Application No. 2019-095784, dated Apr. 25, 2023.
Request for Reconsideration Report by Examiner, dated Aug. 25, 2023 for the corresponding Japanese patent application No. 2019-095784.

* cited by examiner

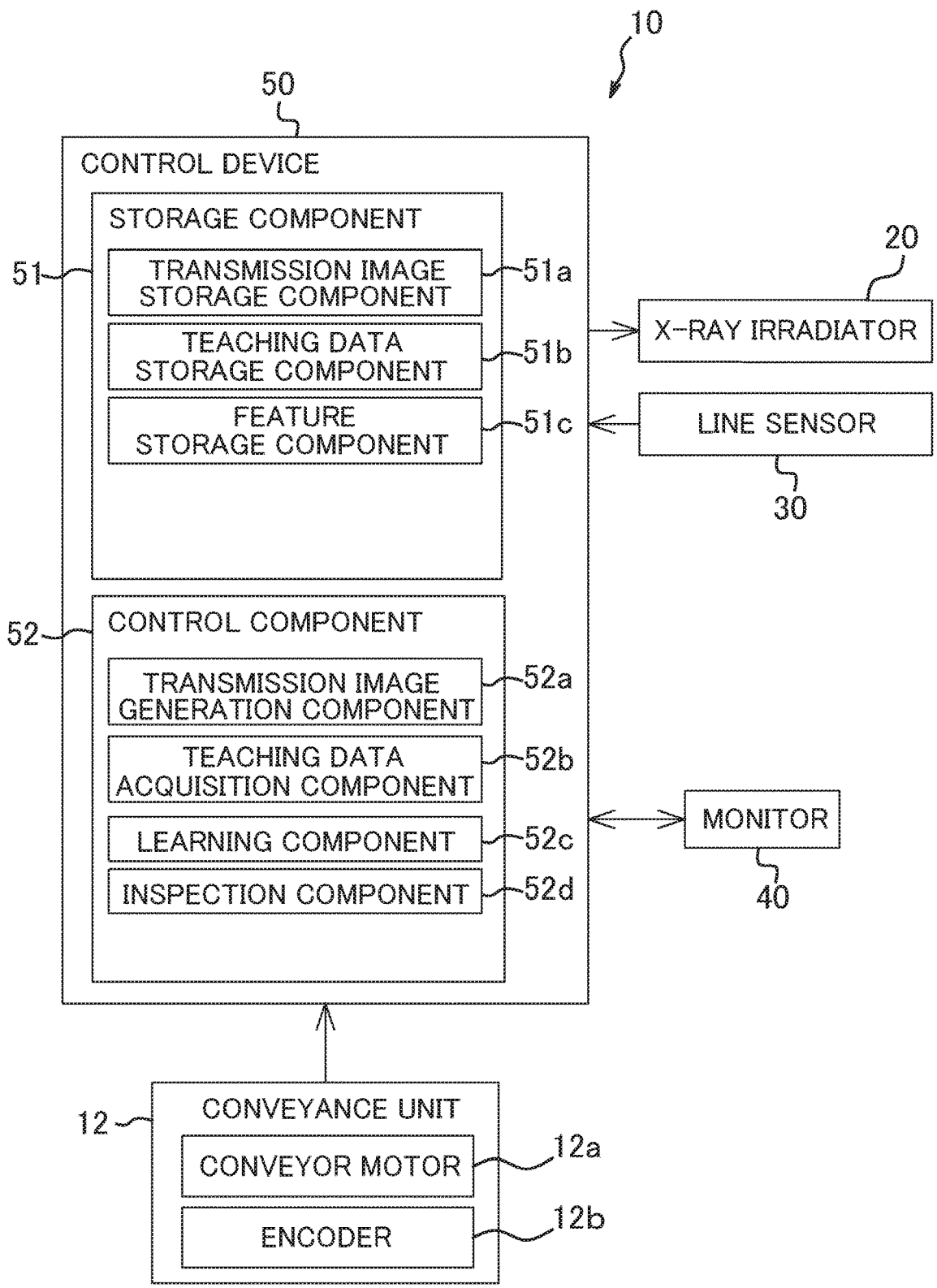
F I G . 6

INSPECTION DEVICE

TECHNICAL FIELD

The present invention relates to an inspection device that irradiates goods such as foods with radiation such as X-rays to perform inspections of the goods.

BACKGROUND ART

Conventionally, as disclosed in JP-A No. 2002-228761, an inspection device that irradiates goods such as foods with radiation such as X-rays to perform inspections of the goods has been used. The inspection device performs the inspections of the goods on the basis of transmission images obtained from radiation that has passed through the goods that undergo inspection. The inspection device, for example, inspects for the presence or absence of contaminants in the goods and the quantities of articles included in the goods.

SUMMARY OF INVENTION

Technical Problem

In a case where the goods that undergo inspection are, for example, bags containing plural articles and the articles sometimes overlap each other inside the bags, a method is used which sets a threshold for the luminance of the transmission images in accordance with the degree of overlap between the articles and determines the degree of overlap between the articles. However, in this case, there is the concern that the greater the degree of overlap between the articles is, the more the accuracy of the inspections of the goods based on the transmission images will be reduced.

It is an object of the present invention to provide an inspection device that can inhibit a reduction in the accuracy of inspections of goods that include plural articles that sometimes overlap each other.

Solution to Problem

An inspection device pertaining to the invention irradiates, with radiation, goods containing plural articles having a predetermined shape and inspects the goods on the basis of inspection images obtained from radiation that has passed through the goods or radiation that has reflected off the goods. The inspection device includes a storage component, a learning component, and an inspection component. The storage component stores, as teaching images, at least the inspection images of the goods that are in a state in which the plural articles overlap each other. The learning component acquires, by machine learning using the teaching images stored in the storage component, features relating to the goods that are in a state in which the plural articles overlap each other. The inspection component inspects the goods using the features that the learning component has acquired.

The inspection device pertaining to the invention executes machine learning using, as the teaching images, the inspection images of the goods that are in a state in which the plural articles overlap each other, so it can inhibit a reduction in the accuracy of the inspections of the goods that include the plural articles that sometimes overlap each other.

Furthermore, it is preferred that the inspection component inspects for the presence or absence of contaminants included in the goods.

Furthermore, it is preferred that the storage component stores, as the teaching images, at least the inspection images of the goods that include contaminants and that the learning component acquires the features relating to the goods by machine learning using the teaching images and regions in the teaching images where there are contaminants included in the goods.

Furthermore, it is preferred that the storage component stores, as the teaching images, at least images in which images of virtual contaminants have been incorporated into the inspection images of the goods that do not include contaminants and that the learning component acquires the features relating to the goods by machine learning using the teaching images and regions in the teaching images where there are the virtual contaminants.

In this case, the inspection device can acquire the features relating to the goods that are in a state in which the plural articles overlap each other without using, as the teaching images, the inspection images of the goods that include actual contaminants.

Furthermore, it is preferred that the inspection component inspects the quantities of the articles contained in the goods.

Furthermore, it is preferred that the learning component acquires the features by machine learning using the teaching images and the quantities of the articles contained in the goods in the teaching images.

Furthermore, it is preferred that the inspection component further inspects the goods on the basis of the inspection images without using the features relating to the goods.

In this case, the inspection device inspects the goods, for example, using a combination of image processing technology that uses machine learning and image processing technology that does not use machine learning, so the reliability of the inspections can be improved.

Furthermore, it is preferred that the inspection component inspects the goods on the basis of inspection results of the goods in a case where it has used the features and inspection results of the goods in a case where it has not used the features.

In this case, the inspection device acquires final inspection results of the goods on the basis of plural inspection results comprising, for example, inspection results in a case where it has used machine learning and inspection results in a case where it has not used machine learning, so the reliability of the inspections can be improved.

Advantageous Effects of Invention

The inspection device pertaining to the invention can inhibit a reduction in the accuracy of inspections of goods that include plural articles that sometimes overlap each other.

BRIEF DESCRIPTION OF DRAWINGS

FIG. 6 is a block diagram of a control device 50.

DESCRIPTION OF EMBODIMENT

An embodiment of the invention will be described with reference to the drawings. The embodiment described below is a specific example of the invention and is not intended to limit the technical scope of the invention.

(1) Overall Configuration of X-Ray Inspection Device

Figure 1:
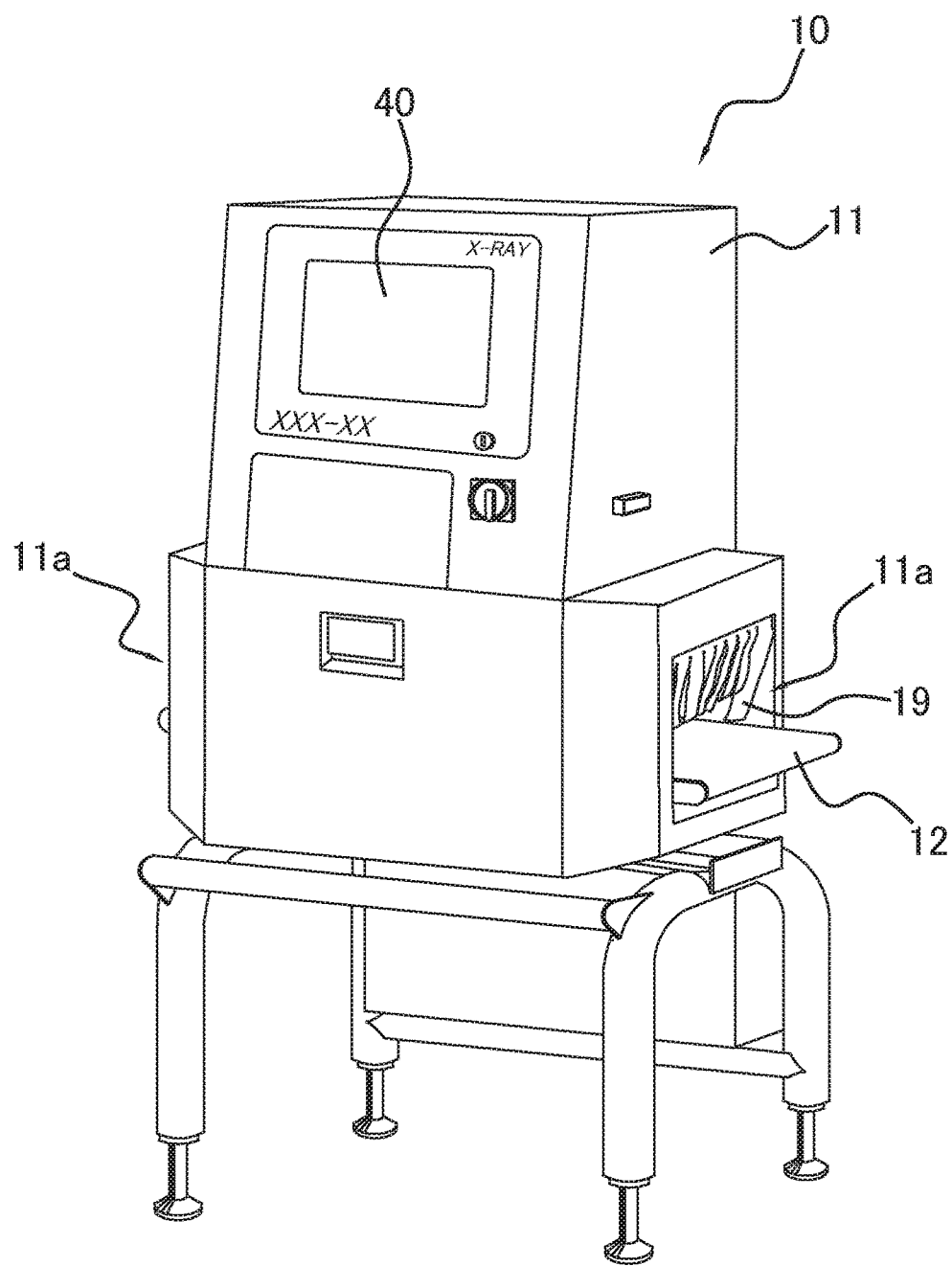
FIG. 1 is a perspective view showing the exterior of an X-ray inspection device 10 that is an embodiment of the invention.
Figure 2:
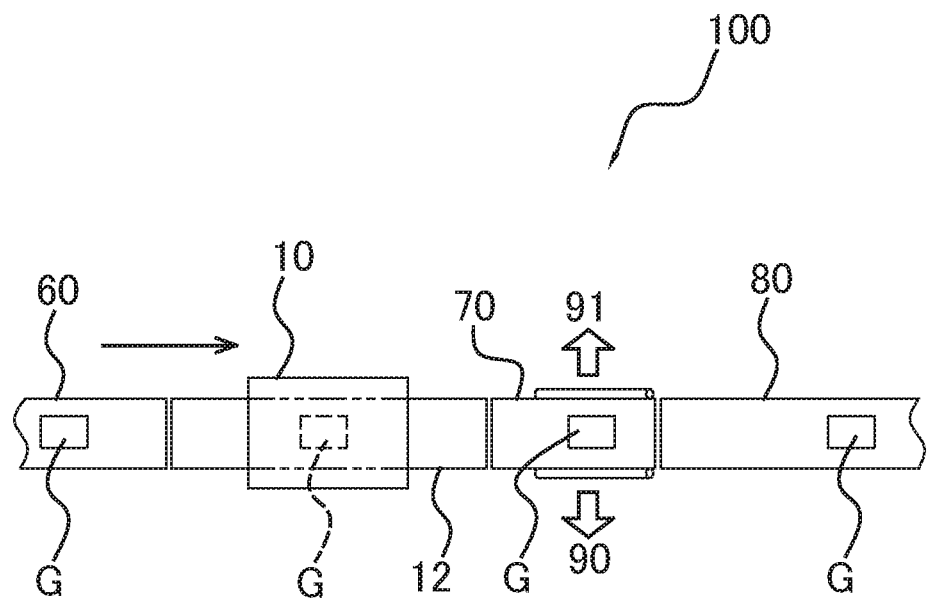
FIG. 2 is a general view of an inspection line 100 that incorporates the X-ray inspection device 10.

FIG. 1 is a perspective view showing the exterior of an X-ray inspection device 10 that is an embodiment of the inspection device pertaining to the invention. FIG. 2 is a general view of an inspection line 100 that incorporates the X-ray inspection device 10. The inspection line 100 performs inspections of goods G. In the inspection line 100, the goods G are conveyed by an upstream conveyor 60 to the X-ray inspection device 10. In FIG. 2, the conveyance direction of the goods G is indicated by an arrow.

The X-ray inspection device 10 performs judgments about the conformity or nonconformity of the goods G by irradiating with X-rays the goods G that are continuously conveyed thereto by the upstream conveyor 60. Specifically, the X-ray inspection device 10 performs contamination inspections of the goods G and, on the basis of the inspection results, sorts the goods G into conforming goods or nonconforming goods. The results of the inspections by the X-ray inspection device 10 are sent to a sorting mechanism 70 disposed downstream of the X-ray inspection device 10. The sorting mechanism 70 sends the goods G judged to be conforming goods in the X-ray inspection device 10 to a downstream conveyor 80 that discharges the conforming goods. The sorting mechanism 70 sorts, in nonconforming good discharge directions 90 and 91, the goods G judged to be nonconforming goods in the X-ray inspection device 10 to discharge them from the inspection line 100.

Figure 3:
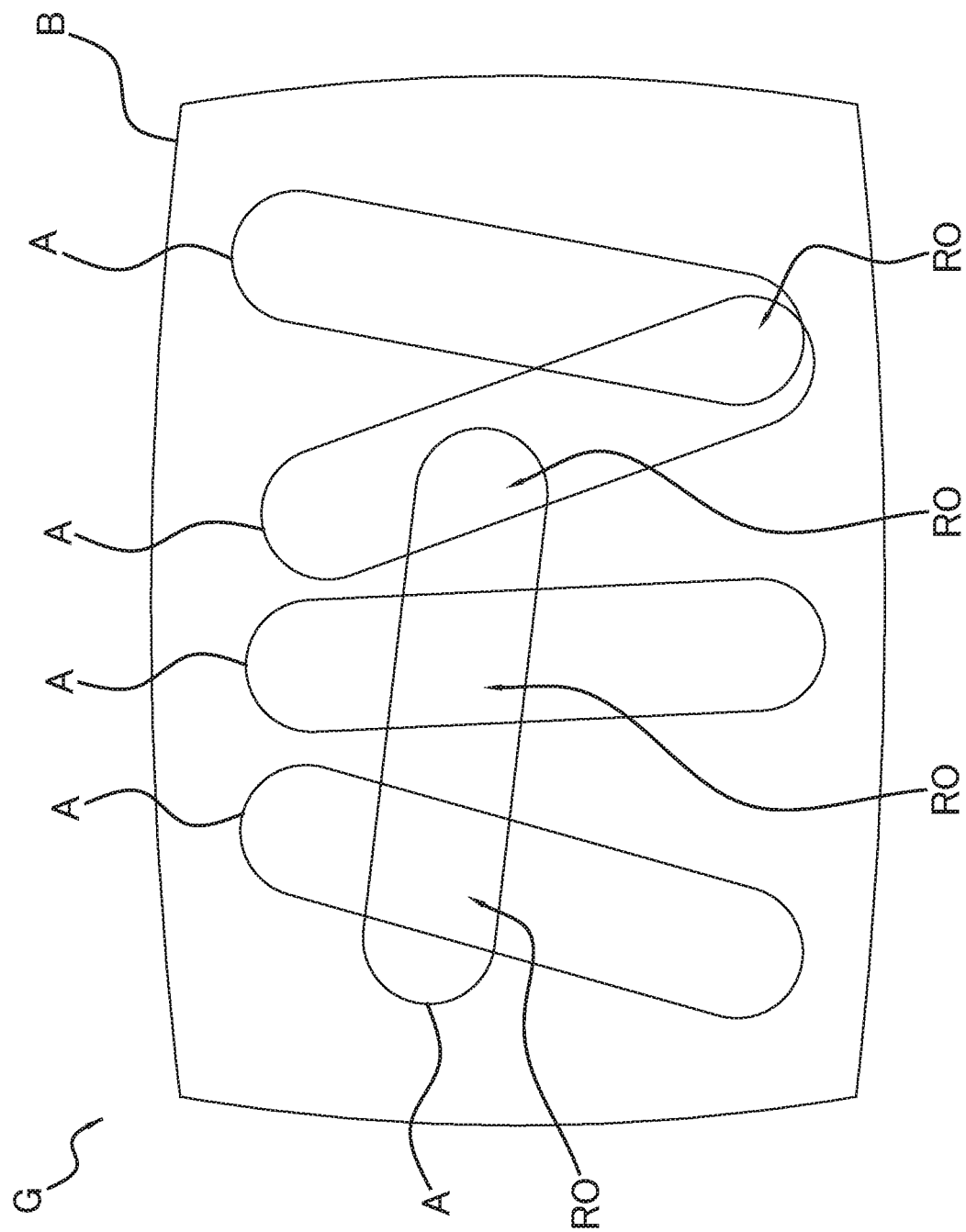
FIG. 3 is an example of a schematic plan view of goods G.

In this embodiment, the goods G contain plural articles A having a predetermined shape. For example, the goods G are bags in which plural foods (articles A) having substantially the same shape are packaged. In one good G, the plural articles A sometimes overlap each other. FIG. 3 is an example of a schematic plan view of goods G. In FIG. 3, the good G is a bag B that contains plural articles A sausages). In this case, as shown in FIG. 3, when the good G is viewed from above, sometimes the articles A overlap each other in the bag B. Below, regions where the plural articles A overlap each other when one good G is viewed from above will be called overlapping regions RO as needed. In FIG. 3, several overlapping regions RO are shown. Most of the goods G inspected by the X-ray inspection device 10 have overlapping regions RO when they are viewed from above.

(2) Detailed Description of X-Ray Inspection Device

The X-ray inspection device 10 is mainly configured from a shield box 11, a conveyance unit 12, an X-ray irradiator 20, a line sensor 30, a monitor 40, and a control device 50.

(2-1) Shield Box

Figure 4:
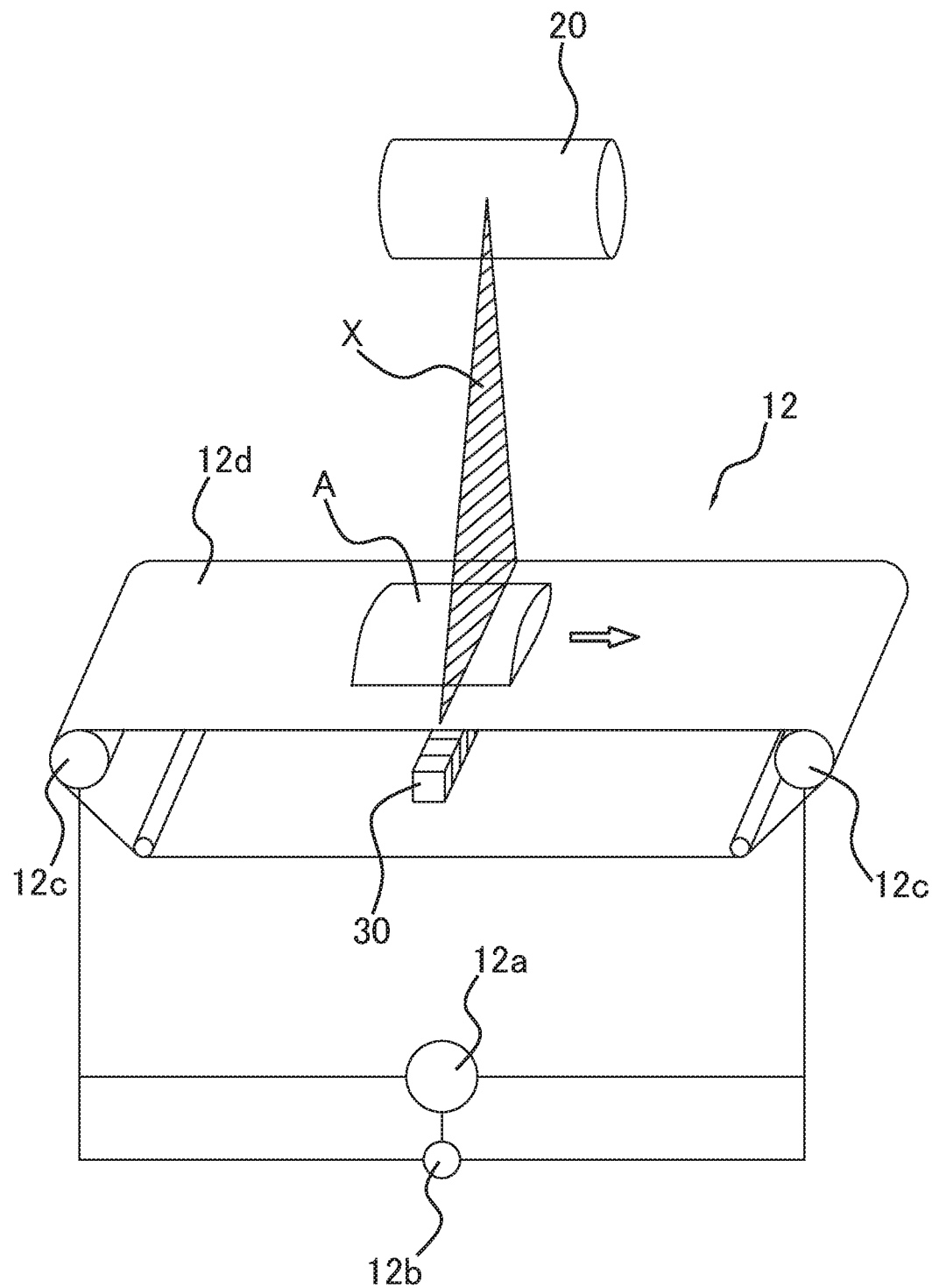
FIG. 4 is a general view of the inside of a shield box 11 of the X-ray inspection device 10.

FIG. 4 is a general view of the inside of the shield box 11 of the X-ray inspection device 10. The shield box 11 is a casing of the X-ray inspection device 10. As shown in FIG. 1, openings 11a for conveying the goods G in and out are formed in both side surfaces of the shield box 11. The openings 11a are used to convey the goods G from the outside of the shield box 11 to the inside or to convey the goods G from the inside of the shield box 11 to the outside. The openings 11a are blocked by shielding curtains 19. The shielding curtains 19 control leakage of the X-rays from the inside of the shield box 11 to the outside. The shielding curtains 19 are formed of tungsten sheets. The shielding curtains 19 are pushed aside by the goods G when the goods G are conveyed in and out.

Contained inside the shield box 11 are the conveyance unit 12, the X-ray irradiator 20, the line sensor 30, and the control device 50 and the like. Disposed in the upper portion of the front face of the shield box 11 are the monitor 40, input keys, and a power switch and the like.

(2-2) Conveyance Unit

The conveyance unit 12 is a belt conveyor for conveying the goods G through the inside of the shield box 11. As shown in FIG. 1, the conveyance unit 12 is disposed so as to run through the openings 11a formed in both side surfaces of the shield box 11.

The conveyance unit 12 is mainly configured from a conveyor motor 12a, an encoder 12b, conveyor rollers 12c, and an endless belt 12d. The conveyor rollers 12c are driven by the conveyor motor 12a. The driving of the conveyor rollers 12c causes the belt 12d to rotate, whereby the goods G on the belt 12d are conveyed. In FIG. 4, the conveyance direction of the goods G is indicated by an arrow.

The speed at which the goods G are conveyed by the conveyance unit 12 changes depending on the set speed that has been input by the operator of the X-ray inspection device 10. The control device 50 inverter-controls the conveyor motor 12a on the basis of the set speed and finely controls the conveyance speed of the goods G. The encoder 12b of the conveyance unit 12 calculates the conveyance speed of the goods G by detecting the rotational speed of the conveyor motor 12a and sends it to the control device 50.

It will be noted that although the conveyance unit 12 uses a belt conveyor as the conveyance mechanism, it may also use, instead of a belt conveyor, a top chain conveyor and a rotating table, for example, as the conveyance mechanism.

(2-3) X-Ray Irradiator

The X-ray irradiator 20 is an X-ray source that irradiates with X-rays the goods G that have been conveyed by the conveyance unit 12 to a predetermined position inside the shield box 11. The X-rays emitted by the X-ray irradiator 20 include X-rays of various energies.

As shown in FIG. 4, the X-ray irradiator 20 is disposed above the conveyance unit 12. The X-ray irradiator 20 emits fan-shaped X-rays (radiation) toward the line sensor 30 disposed under the conveyance unit 12. As shown in FIG. 4, an irradiation range X of the X-rays is perpendicular to a conveyance surface of the conveyance unit 12 and fans out in a direction orthogonal to the direction in which the goods G are conveyed by the conveyance unit 12. That is, the X-rays emitted by the X-ray irradiator 20 fan out in the width direction of the belt 12*d*.

(2-4) Line Sensor

The line sensor 30 is a sensor that detects the X-rays emitted by the X-ray irradiator 20. Specifically, the line sensor 30 detects transmitted X-rays, which are X-rays that have passed through the goods G conveyed by the conveyance unit 12.

As shown in FIG. 4, the line sensor 30 is disposed under the belt 12*d* of the conveyance unit 12. The line sensor 30 is configured from plural X-ray detection elements. The plural X-ray detection elements are horizontally disposed in a straight line along a direction (the width direction of the belt 12*d*) orthogonal to the direction in which the goods G are conveyed by the conveyance unit 12.

Figure 5:
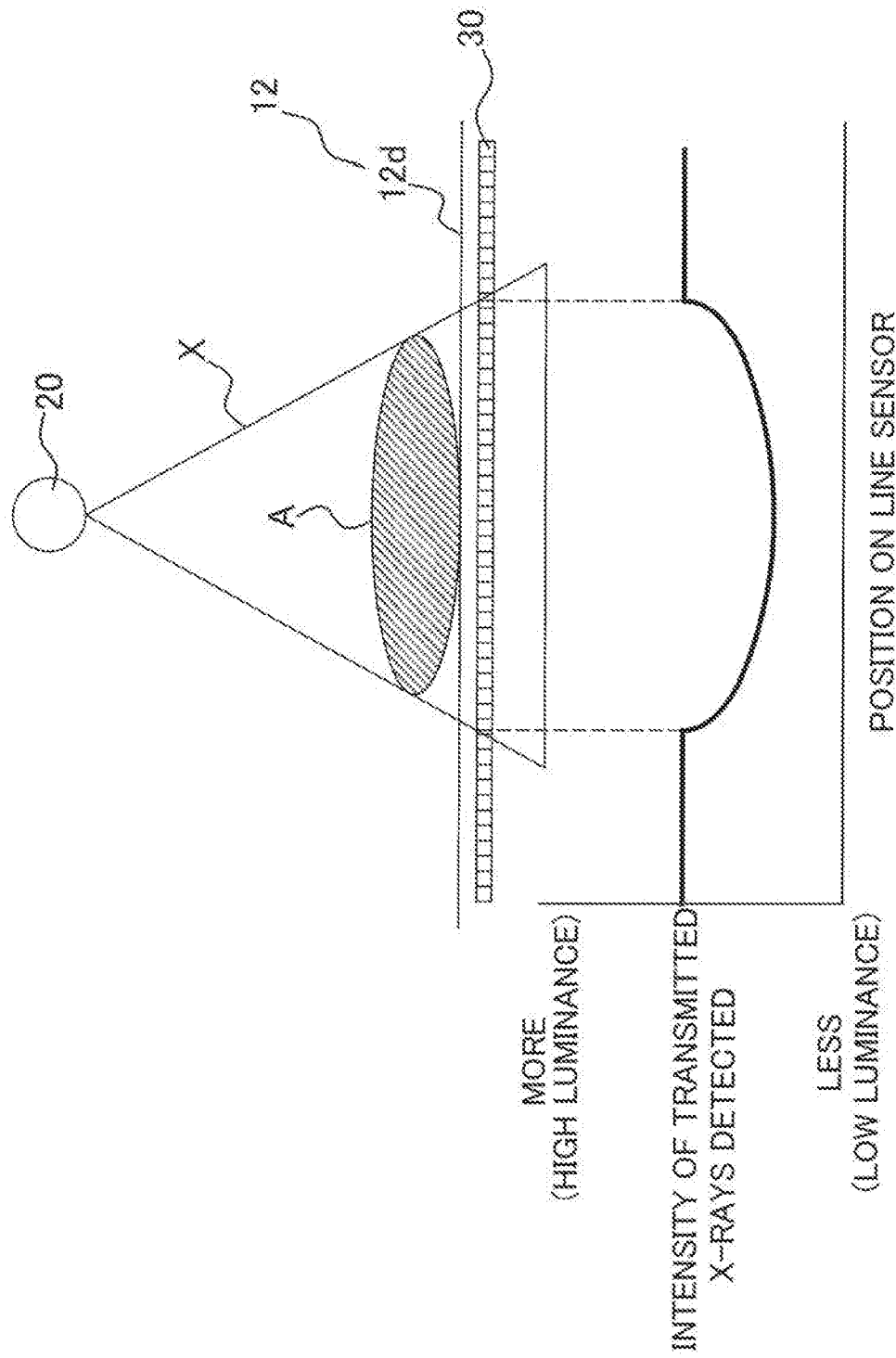
FIG. 5 is a graph showing an example of intensities of transmitted X-rays detected by a line sensor 30.

The line sensor 30 detects the transmitted X-rays and outputs X-ray transmission signals representing voltages according to the intensities of the transmitted X-rays that have been detected. The X-ray transmission signals are used to generate transmission images (inspection images) of the goods G as described later. FIG. 5 is a graph showing an example of intensities of transmitted X-rays detected by the line sensor 30. The horizontal axis of the graph represents the position on the line sensor 30. The vertical axis of the graph represents the intensity of the transmitted X-rays that the line sensor 30 has detected. In the transmission images of the goods G, places where the detected amount of transmitted X-rays is large appear brighter (have a higher luminance) and places where the detected amount of transmitted X-rays is small appear darker (have a lower luminance). That is, the contrast (luminance) in the transmission images of the goods G depends on the detected amount of transmitted X-rays. As shown in FIG. 5, the detected amount of X-rays that have passed through the goods G is lower than the detected amount of X-rays that have not passed through the goods G.

Furthermore, the line sensor 30 also functions as a sensor for detecting the timings when the goods G pass through the fan-shaped irradiation range X of the X-rays (see FIG. 4 and FIG. 5). That is, the line sensor 30 outputs an X-ray transmission signal (a first signal) representing a voltage equal to or less than a predetermined threshold when goods G conveyed by the conveyance unit 12 has reached a position above the line sensor 30 (a position coinciding with the irradiation range X). On the other hand, the line sensor 30 outputs an X-ray transmission signal (a second signal) representing a voltage exceeding the predetermined threshold when goods G passes through the irradiation range X. The timings when the goods G pass through the irradiation range X are detected by the timings of the outputs of the first signals and the second signals.

(2-5) Monitor

The monitor 40 is a liquid crystal display with a touch panel function. The monitor 40 functions as a display component and an input component of the X-ray inspection device 10. The inspection results of the goods G, for example, are displayed on the monitor 40. Furthermore, for example, screens for the input of initial settings and parameters relating to the judgment about the conformity or nonconformity of the goods G are displayed on the monitor 40.

The operator of the X-ray inspection device 10 can operate the monitor 40 to input inspection parameters and operation setting information and the like. The inspection parameters are parameters needed to determine the conformity or nonconformity of the goods G. Specifically, the inspection parameters include a threshold for the intensity of the transmitted X-rays which is used to determine whether or not there are contaminants included in the goods G. The operation setting information is information such as the inspection speed of the goods G and the conveyance direction of the conveyance unit 12.

The monitor 40 is connected to the control device 50 and sends signals to, and receives signals from, the control device 50. The inspection parameters and the operation setting information that have been input by the monitor 40 are stored in a storage component 51 of the control device 50.

(2-6) Control Device

The control device 50 is mainly configured by a CPU, a ROM, a RAM, and a hard disk drive (HDD) and the like. It will be noted that a solid state drive (SSD) may also be used instead of an HDD. The control device 50 also includes a display control circuit, an input circuit, and a communication port and the like that are not shown in the drawings. The display control circuit is a circuit that controls the display of the monitor 40. The input circuit is a circuit that imports input data that have been input by the operator via the touch panel of the monitor 40 and the input keys. The communication port is a port that enables connection to external devices such as a printer and networks such as a LAN.

FIG. 6 is a block diagram of the control device 50. The control device 50 mainly has a storage component 51 and a control component 52. The control device 50 is electrically connected to the conveyor motor 12*a*, the encoder 12*b*, the X-ray irradiator 20, the line sensor 30, and the monitor 40 and the like. The control device 50 acquires data relating to the number of rotation of the conveyor motor 12*a* from the encoder 12*b* and, on the basis of the data, calculates the moving distances of the goods G. The control device 50 receives the X-ray transmission signals that have been output from the line sensor 30 and detects the timings when the goods G on the belt 12*d* of the conveyance unit 12 reach the irradiation range X of the X-rays. The control device 50 determines the conformity or nonconformity of the goods G by determining, on the basis of the intensities of the transmitted X-rays, whether or not there are contaminants included in the goods G.

(2-6-1) Storage Component

The storage component 51 stores the inspection parameters, the operation setting information, and various programs that the control component 52 executes. The inspection parameters and the operation setting information are input by the operator using the touch panel function of the monitor 40.

The storage component 51 mainly has a transmission image storage component 51*a*, a teaching data storage component 51*b*, and a feature storage component 51*c*.

(2-6-1-1) Transmission Image Storage Component

The transmission image storage component 51*a* stores data relating to transmission images generated by a later-described transmission image generation component 52*a*. The transmission images are X-ray images of the goods G generated on the basis of the transmitted X-ray amounts detected by the line sensor 30.

Figure 7:
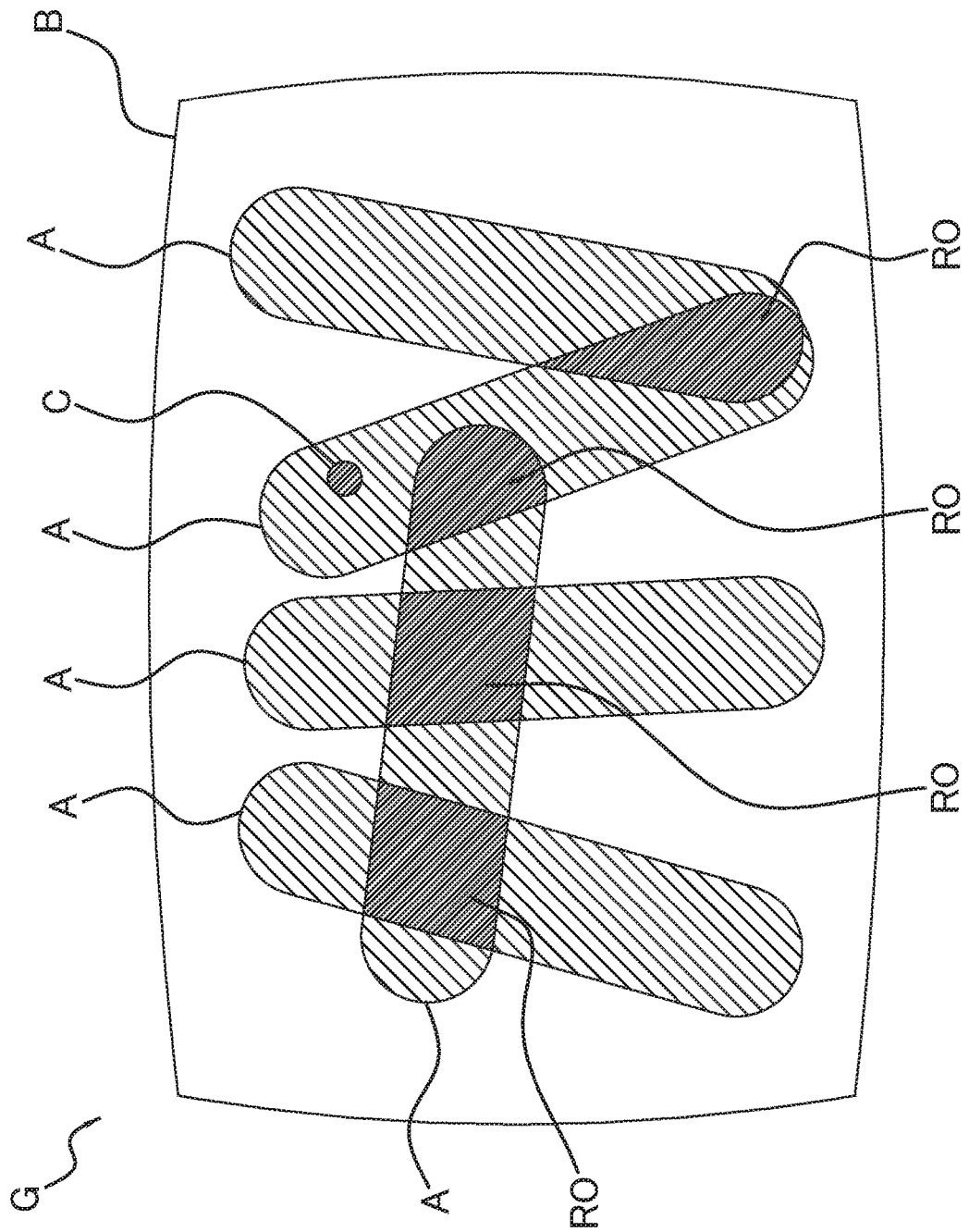
FIG. 7 is a drawing showing an example of a transmission image of goods G.

FIG. 7 is a drawing showing an example of the transmission images of the goods G. The goods G are bags B containing plural articles A as shown in FIG. 3. The articles A are foods. The bags B are film for packaging. As shown in FIG. 7, sometimes the goods G are contaminated with contaminants C. The contaminants C are, for example, plastic fragments and metal fragments. The transmission image shown in FIG. 7 is configured from plural pixels. Each of the pixels of the transmission image has one of plural gray levels. The gray level of each of the pixels of the transmission image corresponds to the detected amount of X-rays. Specifically, the higher the gray level of a pixel is, the lower the detected amount of X-rays in that pixel is. In FIG. 7, the gray levels in the transmission image are represented by hatching intervals. Specifically, the narrower the hatching interval of a given region is, the higher the gray level of the pixels configuring that region is.

The transmission image of the good G shown in FIG. 7 includes pixels corresponding to the articles A, the bag B, and the contaminant C. The X-rays pass less easily through the articles A than they do the bag B because the articles A are greater in thickness than the bag B. For that reason, the detected amount of X-rays that have passed through the articles A is smaller than the detected amount of X-rays that have passed through the bag B. Furthermore, ordinarily X-rays pass less easily through the contaminant C than they do the articles A. For that reason, the detected amount of X-rays that have passed through the contaminant C is smaller than the detected amount of X-rays that have passed through the articles A. Consequently, in the transmission image of the good G shown in FIG. 7, the pixels corresponding to the articles A appear darker (denser) than the pixels corresponding to the bag B, and the pixels corresponding to the contaminant C appear darker (denser) than the pixels corresponding to the articles A.

(2-6-1-2) Teaching Data Storage Component

The teaching data storage component 51b stores teaching data that a later-described learning component 52c uses to acquire features relating to the goods G. The teaching data are mainly image data and other data extracted from the transmission images stored in the transmission image storage component 51a. The other data are, for example, data relating to regions in the transmission images of the goods G where the plural articles A overlap each other (the overlapping regions RO) and data relating to regions in the transmission images of the goods G where there are contaminants C included in the goods G. Details about, and a method of utilizing, the teaching data will be described later.

(2-6-1-3) Feature Storage Component

The feature storage component 51c stores features of the transmission images of the goods G that a later-described inspection component 52d uses for inspection of the goods G. The features are data extracted from the teaching data, and are data obtained by quantifying or vectorizing the features included in the teaching data. Details about, and a method of utilizing, the features will be described later.

(2-6-2) Control Component

The control component 52 mainly has a transmission image generation component 52a, a teaching data acquisition component 52b, a learning component 52c, and an inspection component 52d. These are functions realized by executing the programs stored in the storage component 51.

(2-6-2-1) Transmission Image Generation Component

The transmission image generation component 52a generates X-ray images (transmission images) of the goods G on the basis of the transmitted X-ray amounts detected by the line sensor 30. Specifically, the transmission image generation component 52a acquires, at predetermined short time intervals, the X-ray transmission signals that are output from each of the X-ray detection elements of the line sensor 30 and generates the transmission images on the basis of the X-ray transmission signals it has acquired. That is, the transmission image generation component 52a generates the transmission images of the goods G on the basis of the X-ray transmission signals that are output from each of the X-ray detection elements when the goods G pass through the irradiation range of the fan-shaped X-rays (see FIG. 5). Whether or not there is goods Gin the irradiation range X is judged by the timing of the output of the signals that the line sensor 30 outputs.

The transmission image generation component 52a generates the transmission images of the goods G by joining together in a time series in a matrix the data per predetermined time interval relating to the intensity (luminance) of the transmitted X-rays obtained from each of the X-ray detection elements of the line sensor 30. The transmission images generated by the transmission image generation component 52a are stored in the transmission image storage component 51a.

(2-6-2-2) Teaching Data Acquisition Component

The teaching data acquisition component 52b acquires teaching data that the learning component 52c uses. Contaminated image data, which are data of the transmission images of the goods G that include contaminants C, and uncontaminated image data, which are data of the transmission images of the goods G that do not include contaminants C, are stored beforehand in the transmission image storage component 51a. At least some of the contaminated image data and the uncontaminated image data are data of the transmission images of the goods G that have overlapping regions R. The teaching data acquisition component 52b acquires the contaminated image data and the uncontaminated image data stored in the transmission image storage component 51a. It will be noted that the teaching data acquisition component 52b acquires at least the contaminated image data, and in that case it does not need to acquire the uncontaminated image data. Below, it will be supposed that the teaching data acquisition component 52b acquires both the contaminated image data and the uncontaminated image data. The greater the number of the contaminated image data and the uncontaminated image data that the teaching data acquisition component 52b acquires, the better. For example, the teaching data acquisition component 52b acquires several hundreds or several thousands of each of the contaminated image data and the uncontaminated image data stored beforehand in the transmission image storage component 51a.

Figure 8:
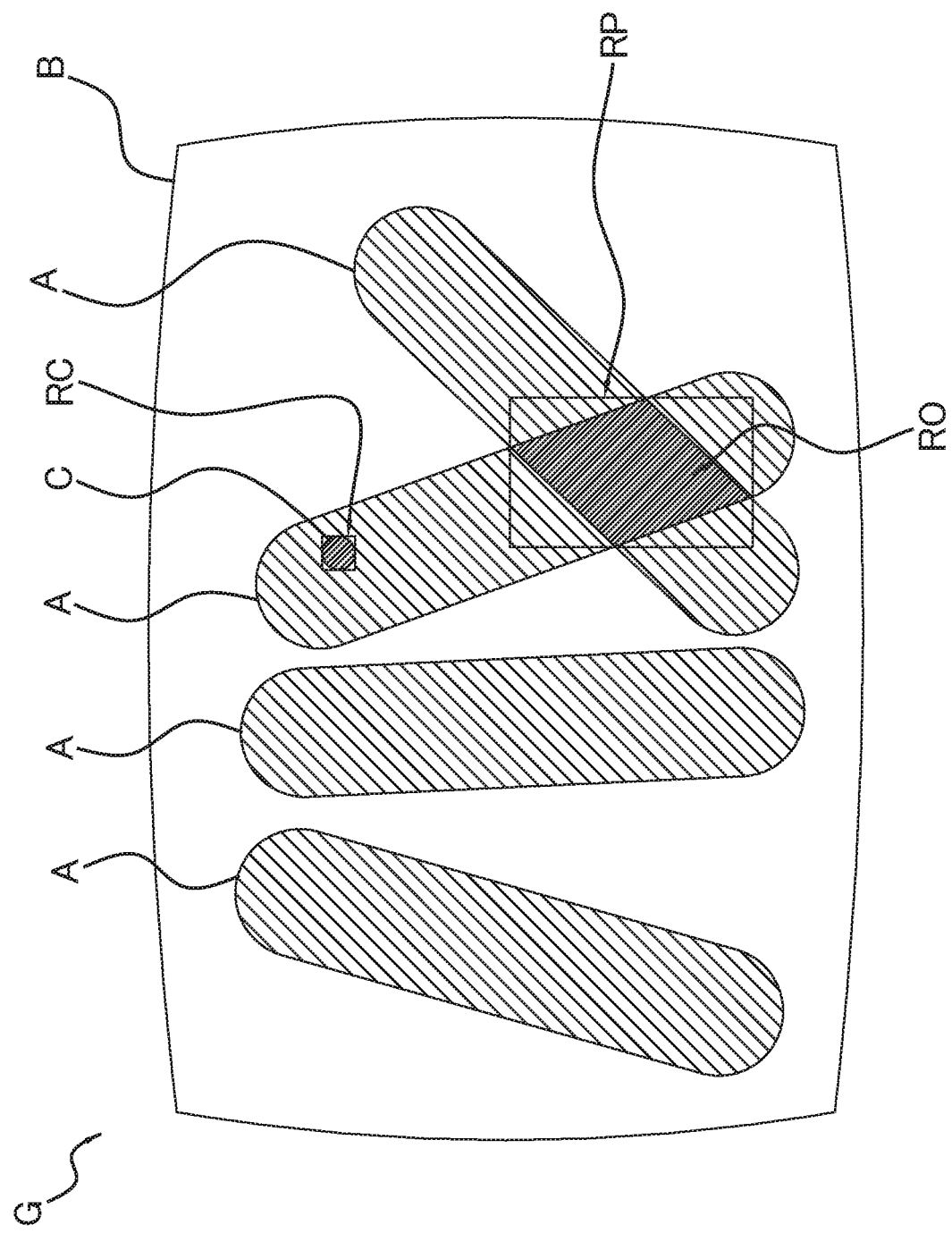
FIG. 8 is a drawing showing an example of a transmission image of goods G that includes a contaminant C.

The teaching data acquisition component 52b also acquires overlapping region data, which are data relating to the regions in the transmission images of the goods G where the plural articles A overlap each other (the overlapping regions RO). The overlapping region data are data relating to the positions and dimensions of the overlapping regions RO in the transmission images of the goods G. FIG. 8 is a drawing showing an example of a transmission image of goods G that includes a contaminant C. In FIG. 8, one overlapping region RO and an overlapping rectangle RP, which is the smallest rectangular region that includes the overlapping region RO, are shown. In this case, the overlapping region data comprise, for example, the coordinates of the pixel at the top left of the overlapping rectangle RP and the coordinates of the pixel at the bottom right of the overlapping rectangle RP. It will be noted that the format of the overlapping region data is not particularly limited. For example, the overlapping region data may also comprise the center and radius of the smallest circular region that includes the overlapping region RO, or may also be a group of coordinates of vertices of a polygon that is close to the shape of the overlapping region RO, or may also be a group of coordinates of a region that has been manually arbitrarily designated.

The teaching data acquisition component 52b also acquires contaminated region data, which are data relating to regions where there are contaminants C in the transmission images of the goods G that include contaminants C. The contaminated region data are data relating to the positions and dimensions of regions having pixels corresponding to contaminants C in the transmission images of the goods G that include contaminants C. In FIG. 8, a contaminated region RC, which is the smallest rectangular region that includes the region having pixels corresponding to the contaminant C, is shown. In this case, the contaminated region data comprise the coordinates of the pixel at the top left of the contaminated region RC and the coordinates of the pixel at the bottom right of the contaminated region RC. It will be noted that the format of the contaminated region data is not particularly limited. For example, the contaminated region data may also comprise the center and radius of the smallest circular region that includes the region having pixels corresponding to the contaminant C, or may be also be a group of coordinates of vertices of a polygon close to the shape of the region having pixels corresponding to the contaminant C, or may also be a group of coordinates of a region that has been manually arbitrarily designated.

The transmission images of the goods G and the overlapping region data and the contaminated region data of each of the transmission images are input via the touch panel function of the monitor 40, for example, or are input from an external storage device via the communication port. A null value or the like indicating that no value exists is set for the overlapping region data in a case where there is no overlapping region RO and the contaminated region data of the uncontaminated image data. The teaching data acquisition component 52b correlates the data of the transmission images of the goods G with the overlapping region data and the contaminated region data of those transmission images and stores the data as teaching data in the teaching data storage component 51b. As described later, the teaching data that the teaching data acquisition component 52b acquires is what is called labeled training data used in supervised learning. In this case, the labels are the overlapping region data and the contaminated region data, and are data that need to be input beforehand.

(2-6-2-3) Learning Component

The learning component 52c acquires, by machine learning using the teaching data stored in the teaching data storage component 51b, features relating to the goods G that are in a state in which the plural articles A overlap each other. The machine learning that the learning component 52c executes is what is called supervised learning using the labeled training data. Supervised learning is a method of learning the features relating to the labels by analyzing the numerous labeled training data. In supervised learning, various types of neural network models can be utilized.

The learning component 52c analyzes the numerous teaching data in which the data of the transmission images of the goods G are correlated with the overlapping region data and the contaminated region data of those transmission images. Because of this, the learning component 52c acquires the features of the contaminated image data and the uncontaminated image data included in the teaching data. The features that the learning component 52c acquires are data relating to the features relating to the goods G that are in a state in which the plural articles A overlap each other. The format of the features is manually designed beforehand. The learning component 52c analyzes the teaching data to acquire the features before the contamination inspections of the goods G are performed and stores in the feature storage component 51c the features it has acquired.

(2-6-2-4) Inspection Component

The inspection component 52d inspects the goods G using the features that the learning component 52c has acquired. Specifically, the inspection component 52d uses the features stored in the feature storage component 51c to sort, into contaminated image data and uncontaminated image data, the data of the transmission images of uninspected goods G that are to undergo contamination inspection.

The inspection component 52d performs conforming good/nonconforming good determinations relating to the goods G on the basis of the inspection results of the goods G. In a case where the inspection component 52d has judged that the data of the transmission image of an uninspected good G is uncontaminated image data and that a contaminant C is not included in the good (3, it determines the good G to be a conforming good. On the other hand, in a case where the inspection component 52d has judged that the data of the transmission image of an uninspected good G is contaminated image data and that a contaminant C is included in the good G, it determines the good G to be a nonconforming good.

When the inspection component 52d determines whether goods G is a conforming good or a nonconforming good, it outputs a signal relating to which of a conforming good and a nonconforming good the good G is. The signal that has been output by the inspection component 52d is sent to the sorting mechanism 70. The sorting mechanism 70, on the basis of the result of the determination by the inspection component 52d, sends goods G that are conforming goods to the downstream conveyor 80 and sorts goods G that are nonconforming goods in the nonconforming good discharge directions 90 and 91.

(3) Operation of X-ray Inspection Device

Figure 9:
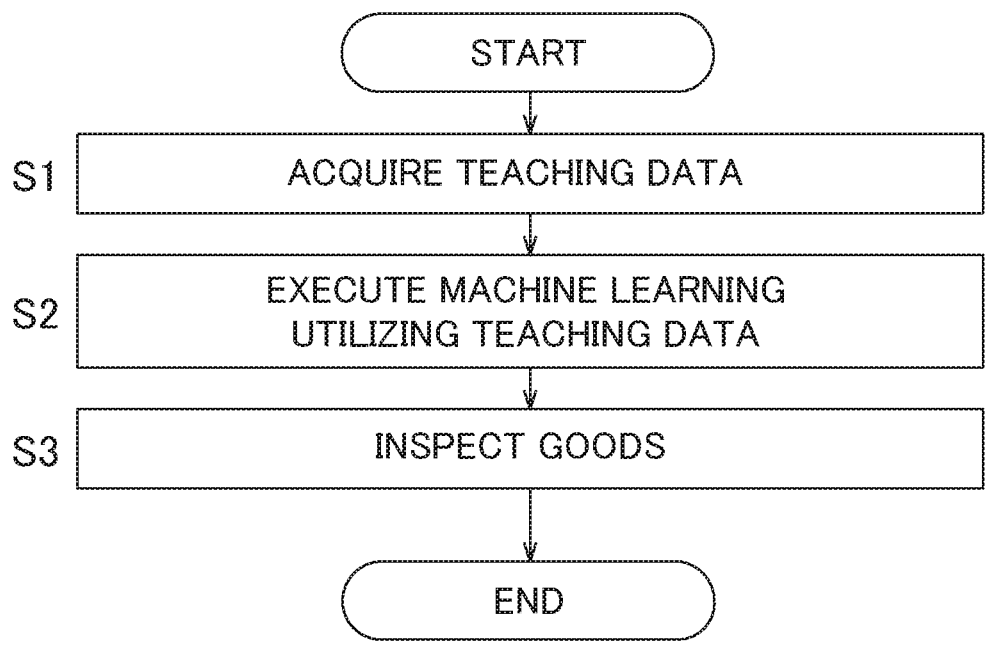
FIG. 9 is a flowchart of a process by which the control device 50 inspects the goods G.

The process by which the control device 50 of the X-ray inspection device 10 inspects the goods G using the features acquired by machine learning utilizing the teaching data will be described. FIG. 9 is a flowchart of the process by which the control device 50 inspects the goods G.

In step S1, acquisition of the teaching data is performed. Specifically, the contaminated image data and the uncontaminated image data are correlated with the overlapping region data and the contaminated region data and are input to the control device 50. The teaching data acquisition component 52b acquires data utilizable as teaching data from the data that have been input and stores the data in the teaching data storage component 51b. It will be noted that, as the contaminated image data and the uncontaminated image data, the data of the transmission images of the goods G that have already been stored in the transmission image storage component 51a, may be used. In this case, the overlapping region data and the contaminated region data are correlated with the data of the transmission images of the goods G and input.

In step S2, execution of machine learning utilizing the teaching data is performed. Specifically, the learning component 52c of the control device 50 analyzes the labeled training data, which are the teaching data that were acquired in step S1 and acquires features of the transmission images of the goods G, which are data relating to the features relating to the goods G that are in a state in which the plural articles A overlap each other. The features of the transmission images of the goods G are stored in the feature storage component 51c. Step S1 and step S2 are a preliminary stage and are performed before inspections of uninspected goods G are executed.

In step S3, inspections of the goods G are performed. Specifically, the inspection component 52d of the control device 50, on the basis of the data relating to the transmission images of the uninspected goods G that have been generated by the transmission image generation component 52a and the features that were acquired in step S2, extracts, from the data relating to the transmission images of the uninspected goods G, features relating to the goods G that are in a state in which the plural articles A overlap each other and sorts them into contaminated image data and uncontaminated image data. Thereafter, the inspection component 52d performs, on the basis of the results of the inspections of the goods G, the conforming good/nonconforming good determinations relating to the goods G.

(4) Characteristics

The X-ray inspection device 10 of this embodiment executes machine learning utilizing the teaching data to acquire data relating to features of the goods G that are in a state in which the plural articles A overlap each other and, on the basis of the features, performs inspections of the goods G. The teaching data include data relating to regions in the transmission images of the goods G where the plural articles A overlap each other (the overlapping regions RO) and data relating to regions in the transmission images of the goods G where there are contaminants C included in the goods G. Because of this, the X-ray inspection device 10 can acquire the overlapping regions RO with high accuracy from the data of the transmission images of uninspected goods G that are to undergo contamination inspections. For that reason, the X-ray inspection device 10 can inhibit a situation where it ends up acquiring erroneous inspection results by confusing the overlapping regions RO included in the transmission images of the goods G with the regions where there are contaminants C included in the transmission images of the goods G when it analyses the transmission images of uninspected goods G.

When irradiating the goods G with X-rays, the X-rays pass less easily through portions where the plural articles A overlap each other than they do portions where the plural articles A do not overlap each other. For that reason, in the transmission images of the goods G, the pixels of the overlapping regions RO appear darker than the pixels corresponding to the articles A outside the overlapping regions RO. For that reason, depending on the degree of overlap between the articles A, sometimes the pixels of the overlapping regions RO are displayed dark to the same extent as the pixels corresponding to contaminants C included in the goods G. When setting a threshold for the luminance of the transmission images in accordance with the degree of overlap between the articles A and determining the degree of overlap between the articles A, there are cases where it is difficult to distinguish, on the basis of luminance alone, between the pixels of the overlapping regions RO and pixels corresponding to contaminants C. For that reason, there is the concern that the accuracy of the inspections of the goods G will be reduced as a result of the overlapping regions RO and the regions where there are contaminants C being erroneously determined. In particular, the more the accuracy of the inspections of the goods G tends to be reduced, the greater the degree of overlap between the articles A is.

The X-ray inspection device 10 of this embodiment inspects the goods G on the basis of the features it has acquired by executing machine learning utilizing the teaching data as described above, so it can be inhibited from confusing the overlapping regions RO included in the transmission images of the goods G and the regions where there are contaminants C when it inspects the goods G. Because of this, the X-ray inspection device 10 can be inhibited from erroneously determining goods G that do not include contaminants C to be nonconforming goods. Consequently, the X-ray inspection device 10 can inhibit a reduction in the accuracy of the inspections of the goods G including the plural articles A that sometimes overlap each other.

(5) Example Modifications

An embodiment of the invention has been described above, but the invention is not limited to the above embodiment, and various changes can be made thereto without departing from the scope of the invention.

(5-1) Example Modification A

In the embodiment, the teaching data acquisition component 52b correlates the contaminated image data, which are data of the transmission images of the goods G that include contaminants C, and the uncontaminated image data, which are data of the transmission images of the goods G that do not include contaminants C, with the overlapping region data and the contaminated region data and acquires the data as the teaching data. However, instead of the contaminated image data, the teaching data acquisition component 52b may acquire virtual contaminated image data, which are data of images in which images of virtual contaminants VC have been incorporated into the transmission images of the goods G that do not include contaminants C. For example, the virtual contaminated image data may be generated by manually adding images of the virtual contaminants VC to arbitrary places in the transmission images of the goods G that do not include contaminants C or may be generated by executing a program that automatically adds images of the virtual contaminants VC to the transmission images of the goods G that do not include contaminants C. For example, the images of the virtual contaminants VC are groups of pixels having about the same luminance as transmission images of actual contaminants C.

In this example modification, the virtual contaminated image data are utilized in the same way as the contaminated image data. That is, the teaching data acquisition component 52b correlates the virtual contaminated image data with the overlapping region data and the contaminated region data and acquires the data as the teaching data. In a case where the virtual contaminated image data are generated automatically, the contaminated region data relating to the positions and dimensions of the regions where there are the virtual contaminants VC can be acquired automatically, so there is no need to input the contaminated region data. The learning component 52c uses the teaching data including the virtual contaminated image data to acquire the features relating to the goods G that are in a state in which the plural articles A overlap each other. Because of this, the learning component 52c acquires the features of the virtual contaminated image data and the uncontaminated image data. The inspection component 52d sorts, on the basis of the features that the learning component 52c has acquired, the transmission images of uninspected goods G into contaminated image data and uncontaminated image data.

In this example modification, the virtual contaminated image data are used, so there is no need to prepare teaching data relating to contaminated image data. For that reason, the amount of time required to prepare the teaching data can be shortened because there is no need to prepare goods G that include actual contaminants C for the preparation of the teaching data. In particular, in a case where the virtual contaminated image data are generated automatically, the amount of time required to prepare the teaching data can be further shortened. Consequently, the X-ray inspection device 10 can efficiently perform inspections of the goods G utilizing machine learning.

It will be noted that in this example modification the teaching data acquisition component 52b may also acquire the virtual contaminated image data together with the contaminated image data. That is, the teaching data acquisition component 52b may also acquire both the teaching data including the contaminated image data of the embodiment and the teaching data including the virtual contaminated image data.

Furthermore, in this example modification the teaching data acquisition component 52b may also acquire virtual uncontaminated image data as the uncontaminated image data. The virtual uncontaminated image data can be created on the basis of the features of the regions other than the contaminated regions of the contaminated image data. Furthermore, the virtual uncontaminated image data may be created using a program that automatically generates virtual uncontaminated image data. The program that automatically generates virtual uncontaminated image data is, for example, a program that randomly combines plural images of the articles A to generate image data (virtual uncontaminated image data) that are the same as images of the goods G and a program that automatically generates virtual uncontaminated image data by synthesizing the images of plural goods G. Time and effort for inputting the teaching data can be saved as a result of the teaching data acquisition component 52b acquiring the virtual uncontaminated image data.

(5-2) Example Modification B

In the embodiment, the X-ray inspection device 10 performs contamination inspections of the goods G and, on the basis of the inspection results, sorts the goods G into conforming goods or nonconforming goods. However, instead of contamination inspections of the goods G, or together with contamination inspections of the goods G, the X-ray inspection device 10 may perform quantity inspections that inspect the quantities of the articles A contained in the goods G.

In this example modification, the teaching data storage component 51b correlates data relating to the transmission images of the goods G with quantity data, which are data relating to the quantities of the goods A included in the goods G, and stores the data as the teaching data. The quantity data are input beforehand to the control device 50 via the touch panel function of the monitor 40 and the communication port, for example. The learning component 52c uses the teaching data including the quantity data to acquire the features relating to the goods G that are in a state in which the plural articles A overlap each other and acquire the features of the data relating to the transmission images of the goods G. The inspection component 52d acquires, from the transmission images of uninspected goods G, the quantities of the articles A included in the goods G on the basis of the features that the learning component 52c has acquired. Then, the inspection component 52d performs the conforming good/nonconforming good determinations relating to the goods G on the basis of the inspection results of the goods G. Specifically, in a case where the quantity of the articles A included in goods G is equal to a predetermined value, the inspection component 52d determines the good G to be a conforming good, and in a case where the quantity is not equal to the predetermined value, the inspection component 52d determines the good G to be a nonconforming good.

(5-3) Example Modification C

In the embodiment, the X-ray inspection device 10 performs the inspections of the goods G on the basis of the features, acquired by machine learning utilizing teaching data, relating to the goods G that are in a state in which the plural articles A overlap each other. However, in addition to inspections utilizing machine learning, the X-ray inspection device 10 may also perform inspections not utilizing machine learning. In this case, the X-ray inspection device 10 determines whether or not there are contaminants C included in the goods G by machine learning utilizing teaching data and also determines whether or not there are contaminants C included in the goods G on the basis of only the transmission images of the goods G without utilizing machine learning.

Conventional image processing algorithms can be utilized for the process of determining whether or not there are contaminants in the goods G based on only the transmission images of the goods G. For example, the inspection component 52d judges that contaminants C are included in the goods G in a case where it has judged that pixel regions representing contaminants C are included in the transmission images of the goods G. For example, the pixel regions representing contaminants C are configured from pixels having a luminance in a predetermined range and are pixel regions having a predetermined pixel number. In this case, the inspection component 52d may determine the goods G to be conforming goods with inspections of the goods G utilizing machine learning and may determine the goods G to be nonconforming goods in a case where it has determined the goods G to be nonconforming goods with inspections of the goods G not utilizing machine learning.

In the inspections of the goods G utilizing machine learning in the embodiment, for example, when the inspection component 52d inspects the goods G, there is the potential for the inspection component 52d to confuse the overlapping regions RO included in the transmission images of the goods G with regions where there are contaminants C, which affects the accuracy of the conforming good/nonconforming good determinations relating to the goods G. In this example modification, the X-ray inspection device 10 inspects the goods G using a combination of image processing technology that utilizes machine learning and image processing technology that does not utilize machine learning, so the reliability of the inspections of the goods G can be improved. It will be noted that in the inspections of the goods G not utilizing machine learning, determinations that combine image processing technologies that do not utilize machine learning may also be performed. Because of this, it becomes possible to further improve the reliability of the inspections of the goods G.

(5-4) Example Modification D

In the embodiment, the X-ray inspection device 10 performs the inspections of the goods G on the basis of the features, acquired by machine learning utilizing teaching data, relating to the goods G that are in a state in which the plural articles A overlap each other. However, the X-ray inspection device 10 may also acquire final inspection results of the goods G on the basis of plural inspection results acquired using machine learning. In this case, the plural inspection results are acquired by supervised learning using mutually different plural neural network models. For example, the inspection component 52d performs inspections of the goods G using plural machine learning algorithms and, on the basis of the plural inspection results, acquires final inspection results of the goods G.

Figure 10:
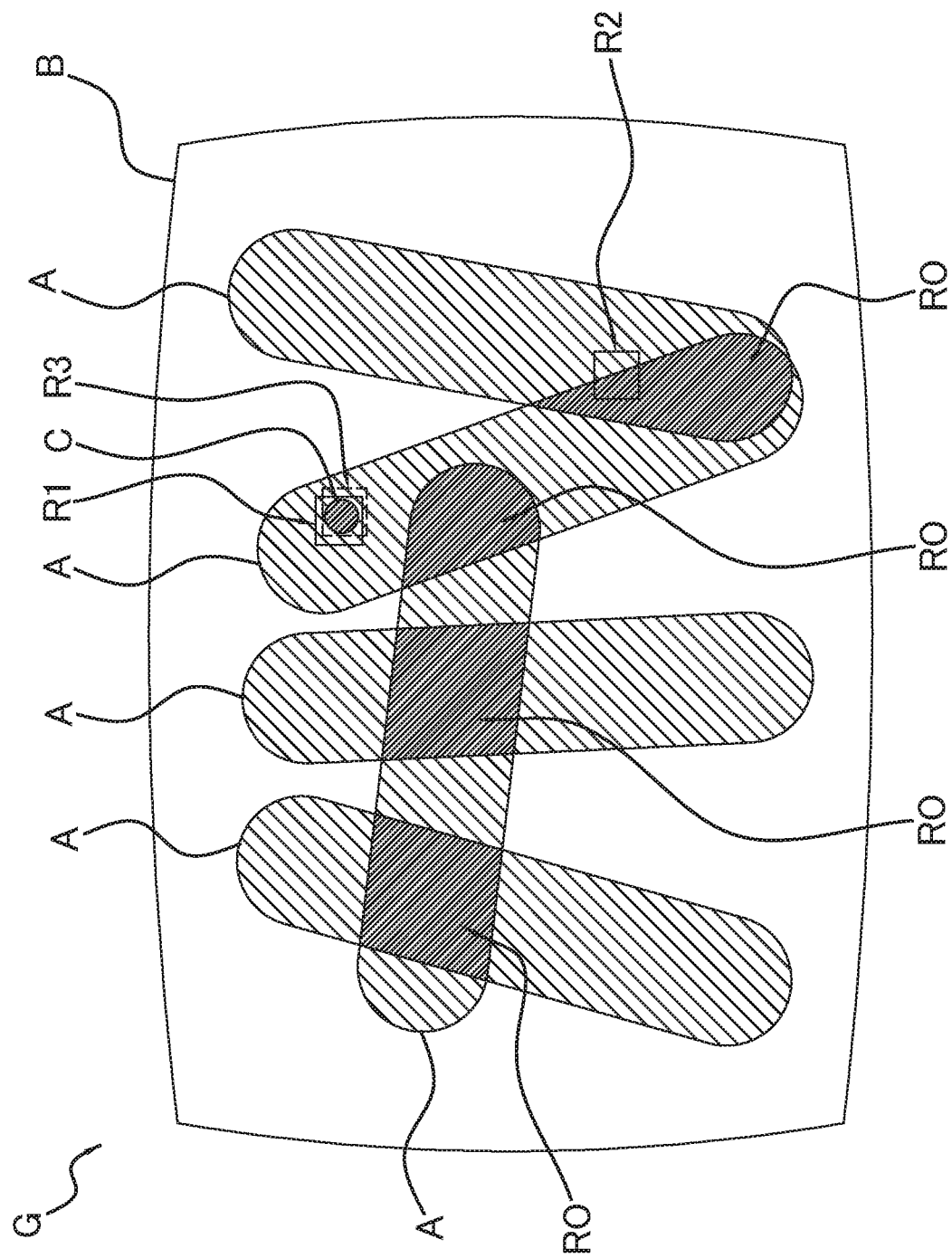
FIG. 10 is an example of a transmission image of goods G in example modification D.

Next, a specific example of a method of acquiring the final inspection results of the goods G in this example modification will be described. FIG. 10 is an example of a transmission image of goods G in this example modification. The inspection component 52d uses two types of machine learning algorithms to acquire two inspection results for the good G. Below, the two inspection results acquired will be called a first inspection result and a second inspection result. In FIG. 10, it will be supposed that in the first inspection result it has been determined that there are contaminants C in inspection regions R1 and R2 surrounded by solid lines and that in the second inspection result it has been determined that there is a contaminant C in inspection region R3 surrounded by a dashed line. In actuality, there is a contaminant C in inspection region R1 and inspection region R3 but there is not a contaminant C in inspection region R2.

In the inspections of the goods G using plural machine learning algorithms, a certainty factor parameter is set for each of the inspection regions R1 to R3. The certainty factor is a parameter indicating the likelihood that there is a contaminant C in each of the inspection regions R1 to R3. The smallest value of the certainty factor is 0 and the largest value is 1. The larger the certainty factor of a given inspection region is, the greater the likelihood that there is a contaminant C in that inspection region. In FIG. 10, it will be supposed that the certainty factor of inspection region R1 in the first inspection result is 0.9, the certainty factor of inspection region R2 in the first inspection result is 0.8, and the certainty factor of inspection region R3 in the second inspection result is 0.7. In this case, the inspection component 52d acquires a final inspection result of the good G from the first inspection result and the second inspection result by the method described below.

In a case where the inspection regions of the different inspection results overlap each other, a final certainty factor is acquired by multiplying the average of the certainty factors of the mutually overlapping inspection regions by a coefficient greater than or equal to 1 according to the degree of overlap between the inspection regions. In the case of FIG. 10, inspection region R1 and inspection region R3 overlap, so 0.96, obtained by multiplying the average 0.8 of the certainty factor 0.9 of inspection region R1 and the certainty factor 0.7 of inspection region R3 by a coefficient of 1.2, becomes the final certainty factor of inspection region R1 and inspection region R3. The greater the degree of overlap between the inspection regions is, that is, the greater the number of inspection regions that overlap each other is, the higher the coefficient in this case is. For example, in a case where two inspection regions overlap, the coefficient is 1.2, and in a case where three inspection regions overlap, the coefficient is 1.5.

However, in a case where the inspection region of a given inspection result does not overlap an inspection region of another inspection result, a final certainty factor is acquired by multiplying the certainty factor of that inspection region by a coefficient less than 1. In the case of FIG. 10, inspection region R2 does not overlap the inspection region of the other inspection result, so 0.72, obtained by multiplying the certainty factor 0.8 of inspection region R2 by a coefficient of 0.9, becomes the final certainty factor of inspection region R2. An arbitrary value less than 1 is set for the coefficient in this case.

Then, the inspection component 52d determines that there is a contaminant C in inspection regions having a final certainty factor greater than or equal to a predetermined threshold. In the case of FIG. 10, supposing that the predetermined threshold is 0.95, the inspection component 52d determines that there is a contaminant C in inspection region R1 and inspection region R3 that have a final certainty factor of 0.96, which is greater than or equal to the threshold 0.95. In this way, the inspection component 52d acquires final inspection results of the goods G by a majority decision based on plural inspection results, so the reliability of the inspections of the goods G can be improved.

It will be noted that in this example modification the inspection component 52 may also acquire the final inspection results of the goods G on the basis of plural inspection results comprising inspection results of the goods G in a case where it has used the features relating to the goods G acquired by machine learning utilizing teaching data and inspection results of the goods G in a case where it has not used the features relating to the goods G. In this case, the inspection component 52 acquires the final inspection results of the goods G by a majority decision based on plural inspection results using the method described above with reference to FIG. 10.

(5-5) Example Modification E

In the embodiment and other example modifications, the X-ray inspection device 10 performs the inspections of the goods G on the basis of the features, acquired by machine learning utilizing teaching data, relating to the goods G that are in a state in which the plural articles A overlap each other. The machine learning that the learning component 52c executes is supervised learning. Supervised learning is a method of learning predetermined features by analyzing numerous labeled training data. In supervised learning, it is necessary to manually design beforehand the format of the features.

However, the machine learning that the learning component 52c executes may also be learning that does not use labeled training data. For example, the learning component 52c may also use a deep learning algorithm to automatically extract, from the transmission images of numerous goods G, features of contaminated image data and uncontaminated image data. In this case, it is not necessary to manually design beforehand the format of the features. For that reason, it is not necessary to prepare teaching data in which contaminated image data and contaminated region data are correlated with each other, and the amount of time required to prepare the teaching data can be shortened. Consequently, the X-ray inspection device 10 can efficiently perform the inspections of the goods G utilizing machine learning by using an algorithm that automatically extracts features from the data relating to the transmission images of the goods G.

(5-6) Example Modification F

In the embodiment, the inspection device pertaining to the invention is the X-ray inspection device 10 that performs contamination inspections of the goods G using X-rays. However, the inspection device pertaining to the invention is not limited to the X-ray inspection device 10. For example, the inspection device may also be a device that performs contamination inspections of the goods G using infrared, ultraviolet, and visible light and the like, provided that the inspection device is a device that performs contamination inspections using radiation typically used in food manufacturing processes.

(5-7) Example Modification G

In the embodiment and other example modifications, the X-ray inspection device 10 irradiates the goods G with radiation (X-rays) and inspects the goods G on the basis of the transmission images (inspection images) obtained from radiation that has passed through the goods G. However, the X-ray inspection device 10 may also irradiate the goods G with radiation (X-rays) and inspect the goods G on the basis of inspection images obtained from radiation that has reflected off the goods G. In this case, the line sensor 30 detects the X-rays that have reflected off the goods G conveyed by the conveyance unit 12.

INDUSTRIAL APPLICABILITY

The inspection device pertaining to the invention is applicable, for example, as an X-ray inspection device that irradiates goods such as foods with radiation such as X-rays to perform inspections of the goods.

The invention claimed is:

1. An inspection device that irradiates, with radiation, goods containing plural articles having a predetermined shape and inspects the goods on the basis of inspection images obtained from radiation that has passed through the goods or radiation that has reflected off the goods, the inspection device comprising:
   an electronic controller having a CPU and electronic memory that includes a storage component that stores teaching data that correlates the inspection images of the goods that are in a state in which the plural articles overlap each other with overlapping region data and contaminated region data of the inspection images;
   the electronic controller further includes a learning component that acquires, by machine learning using the teaching data stored in the storage component, features of the inspection images extracted from the teaching data, as features relating to the goods that are in a state in which the plural articles overlap each other, the features of the inspection images being the features of the inspection images of the goods that include contaminants and the features of the inspection images of the goods that do not include contaminants; and
   the CPU is connected to an inspection irradiator and sensors that inspects for the presence or absence of contaminants included in the goods using the features that the learning component has acquired,
   the overlapping region data are data relating to regions where the plural articles overlap each other in the inspection images,
   the contaminated region data are data relating to regions where there are contaminants in the inspection images.

2. The inspection device according to claim 1, wherein the storage component stores, as the teaching images, at least the inspection images of the goods that include contaminants, and
   the learning component acquires the features by machine learning using the teaching images and regions in the teaching images where there are contaminants included in the goods.

3. The inspection device according to claim 1, wherein the storage component stores, as the teaching images, at least images in which images of virtual contaminants have been incorporated into the inspection images of the goods that do not include contaminants, and
   the learning component acquires the features by machine learning using the teaching images and regions in the teaching images where there are the virtual contaminants.

4. The inspection device according to claim 1, wherein the inspection irradiator further inspects the quantities of the articles contained in the goods.

5. The inspection device according to claim 4, wherein the learning component acquires the features by machine learning using the teaching images and the quantities of the articles contained in the goods in the teaching images.

6. The inspection device according to claim 1, wherein the inspection irradiator acquires a final inspection result of the goods on the basis of a plurality of inspection results comprising first inspection results of the goods in a case where it has used the features acquired by the learning machine and second inspection results of the goods in a case where it has not used the features acquired by the learning machine.

7. An inspection device that irradiates, with radiation, goods containing plural articles having a predetermined shape and inspects the goods on the basis of inspection images obtained from radiation that has passed through the goods or radiation that has reflected off the goods, the inspection device comprising an electronic controller having a CPU and electronic memory:
   the electronic memory includes a storage component that stores teaching data that correlates the inspection images of the goods that are in a state in which the plural articles overlap each other, with overlapping region data and contaminated region data of the inspection images;
   the electronic controller includes a learning component that acquires features of the inspection images extracted from the teaching data, as features relating to the goods, the features of the inspection images being features of the inspection images of the goods that include contaminants and features of the inspection images of the goods that do not include contaminants; and the CPU is connected to an inspection irradiator and sensors that inspects for the presence or absence of contaminants included in the goods using the features that the learning component has acquired, wherein the inspection irradiator and sensors acquires a final inspection result of the goods on the basis of a plurality of inspection results comprising first inspection results of the goods in a case where it has used the features acquired by the learning machine and second inspection results of the goods in a case where it has not used the features acquired by the learning machine, the overlapping region data are data relating to regions where the plural articles overlap each other in the inspection images, and the contaminated region data are data relating to regions where there are contaminants in the inspection images.

* * * * *